May 20, 1952

E. M. CLINES 2,597,705

ROADSIDE SIGNAL LIGHTING DEVICE

Filed March 2, 1950

Inventor
Edwin M. Clines
By Arthur H. Sturges
Attorney

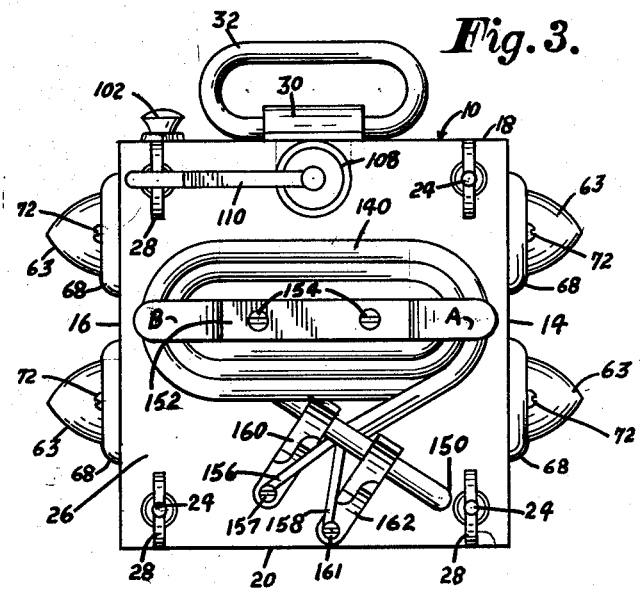

Patented May 20, 1952

2,597,705

UNITED STATES PATENT OFFICE 2,597,705

ROADSIDE SIGNAL LIGHTING DEVICE

Edwin M. Clines, Omaha, Nebr., assignor of one-half to E. R. Barnhart, Omaha, Nebr.

Application March 2, 1950, Serial No. 147,181

2 Claims. (Cl. 177—329)

The present invention relates to self-propelled vehicles including automobiles and buses which travel upon a public highway and has special reference to signal lights thereof.

It is an object of the invention to provide a device which may be readily attached to and removed from a motor vehicle for causing certain incandescent lamps employed to be electrically energized by battery circuit of a highway vehicle.

Another object of the invention is to provide a device which provides a factor of safety during the use thereof and at times when a tire of a vehicle is changed or similar repairs made to a vehicle while the latter is upon or closely adjacent to the pavement of a public highway.

A still further object of the invention is to provide a device for the foregoing purposes which is so arranged that a cooperative trouble light is provided for facilitating a changing of a tire while at the same time guarding the workmen against accidents during said work.

An important object of the invention is to provide a device which is comparatively compact and may be readily stored when not in use in an accessible portion of a vehicle.

Other and further objects and advantages of the invention will be understood from the following detailed description thereof.

In the drawings:

Figure 3 is a view of that side of the new device which is opposite with respect to the showing thereof in Figure 1.

Figure 4 is a view of the back side of the new device, a certain cover plate employed being removed and showing certain electrical circuits employed, certain portions of the new device being broken away.

Figure 1:
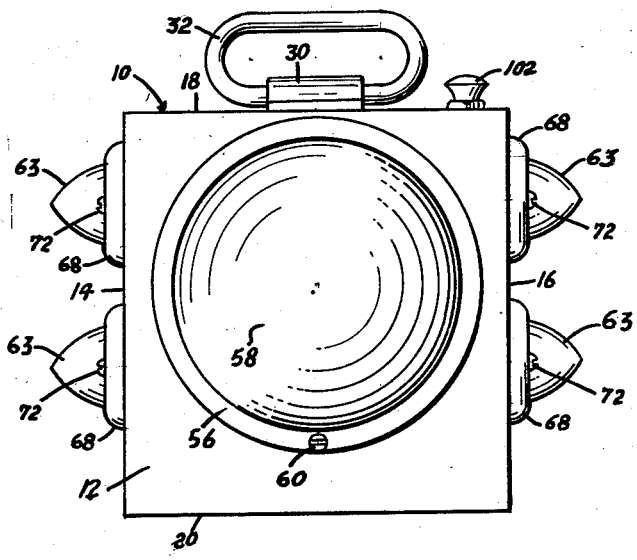
Figure 1 is a front elevation of the new device.

Referring now to the drawings for a more particular description:

The new device includes a housing or frame 10 having a front wall 12, the latter, as best shown in Figure 1, being rectangular in plan. The housing further includes oppositely disposed side walls 14 and 16, a top 18 and a bottom 20, whereby the later described mechanism, during use, is enclosed in the housing and protected against contact with snow, dust, rain and similar foreign substances, together with a preventing of unauthorized persons from tampering with the mechanism.

Preferably the housing is formed of sheet metal and reinforcements 22 are provided within the housing at the corners of the latter and at the junction of the said top, bottom and side walls.

Each of the reinforcements 22 is provided with an outwardly disposed stud bolt 24. The shanks of the stud bolt extend through apertures disposed through the back 26 of the housing. Wing-nuts 28 are provided for each stud bolt and threadedly engaged therewith, whereby, at times when the parts are in the relative position shown in Figure 2 the wing-bolts secure the back 26 to the other portions of the frame or housing.

Secured to the top 18, by any suitable means, a C-shaped detent 30 is provided for pivotally attaching a handle 32 to the housing in a manner whereby the handle may be folded against the top or roof of the housing when not in use.

As best shown in Figure 4, a platform 34 extends across the interior of the housing from the side wall 14 of the latter to the side wall 16 thereof, said platform having a tang 38 secured to the wall 14 by any suitable means and a similar tang 40 to the wall 16.

The platform 34 is provided with a portion 36, the latter being disposed at a right angle to the platform 34.

Approximately midway between the ends of the platform 34 and aperture 42 is disposed therethrough, said aperture being represented by means of dotted lines and a bolt 44 is inserted through the said aperture. The bolt is rigidly secured to a plate 46 employed for mounting certain later described instrumentalities thereon.

The plate 46 is secured to a supporting-plate 48 by means of screws or similar keepers 50. A nut 52 is threadedly engaged to the threaded portion of the bolt 44, said nut being seated against the platform 34 for locking the parts together.

The supporting-plate 48 is formed integral with the reflecting mirror of what is commercially known as a sealed beam incandescent light such as are conventionally employed for headlights on self-propelled highway vehicles such as buses, trucks and automobiles.

The supporting-plate 48 as best shown in Figure 4 is circular in plan being a concaval, convex contour in cross section namely the same shape in cross section as the said reflecting mirror or surface of the sealed beam head lamp or incandescent lamp.

Figure 2:
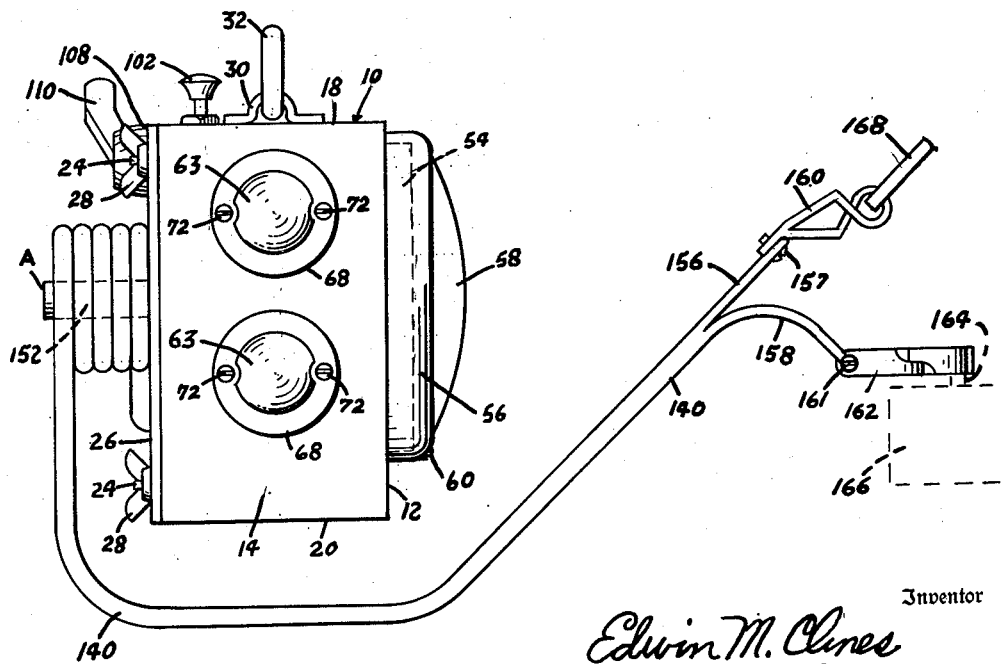
Figure 2 is a side elevation thereof and depicting it in electrical communication with certain portions of a self-propelled vehicle.

The front wall 12 of the housing is provided with a large circular opening which is complemental to the ferrule portion 54 of the said sealed beam lamp, said ferrule portion being snugly received in said opening of the front wall and as best shown in Figure 2, the ferrule 54 extends through and beyond the front wall 12 of the housing.

The ferrule 54 is encircled by a retaining ring 56, the latter being secured to the front wall by means of one or more suitable keepers such as the screws 60. The ring 56 also receives the perimetrical edge of a clear glass front portion of said sealed beam lamp said portion being indicated at 58 and as best shown in Figure 2, the member 58 is convex in side elevation for diffusing light beams which emanate from the filament 58' of said sealed beam lamp.

As best shown in Figure 4 the wall 14 is provided with one or more, preferably two, sockets for incandescent lamps 62' which are carried by said wall, said sockets being disposed through openings in said wall. An incandescent lamp 62 is electrically connected to each socket although but one of said lamps is shown in the drawings.

As shown in Figure 4 of the drawings a shield 63 of a red colored glass or red colored translucent plastic is provided for each incandescent lamp 62 being disposed over the lamp, as shown in Figure 4, whereby beams of light which are emitted from the lamp 62, as later described, become diffused and appear to the eye as of red color.

The side wall 16 is similarly provided with one or more red colored incandescent lamps.

The said sockets are indicated at 62' and since the incandescent lamps for emitting red colored light beams are each of a like construction, but one thereof is minutely described herein. Each socket is provided with a flange 64 formed integral therewith.

A ring 66 is interposed between the flange 64 of the socket 62' and the adjacent side wall of the housing 10.

The shank of a bolt 72 is disposed through the flange 64 of the wall 16 and an annular retaining collar 68 whereby, at times when the nut of the bolt 72 is firmly fitted the said parts become locked together. The resilient rubber washer 66 functions to seal the opening for the socket 62' against the entrance of rain or the like into the housing and also cushions the filaments of the lamps 62 against vibratory shocks and jars for conserving said filaments.

It will be understood that the cover 63 for the incandescent lamp 62 is also maintained in operative position by means of the collar 68 and the bolt 72.

A lamination of insulation 74 is secured to the heretofore mentioned platform 34 by any suitable means such as the nut and bolt assembly 78. The member 74 is interposed between the metallic platform 34 and certain electrical instrumentalities now to be described.

Binding posts 80 and 84 are employed. The binding posts 80 and 84 are in electrical communication with each other through an electrode or plate 88.

The binding posts 82 and 86 are insulated from the plate electrode 88 since they are disposed to one side of the latter, said binding posts being connected together as later described.

A condenser 90 is employed and is supported within the housing by any suitable means such as the L-shaped bracket 92 and in conjunction with the bolt 94. The terminal posts 96 and 98 for the condenser being connected to the instrumentalities as later described.

A push-pull type switch 100 is employed having a manipulatable knob or handle 102, said switch being carried by the top 18 of the housing. The switch is provided with two binding posts 104 and 106.

An oscillating switch 108 is employed for distributing certain light beams intermittently as later described. The switch 108 is secured by any suitable means to the inside surface of the top portion 18 of the housing 10 having a swingable handle 110 for manually opening and closing the said switch, the latter being provided with binding posts 112, 114 and 116 represented by means of dotted lines in Figure 4.

Each of the sockets 62' is provided with a circuit wire 120. The wires extend to and are in electrical communication with junction posts or the like 122. The junction post 122 for the lamps carried by the side wall 16 is provided with a wire or electrical conductor 124 which extends to the binding post 80 being in electrical communication with the electrode or plate 88 and the wire 126 for the lamps carried by the side wall 14 similarly extend to and are electrically connected with the binding post 84 of the plate 88.

A wire 130 employed has its opposite ends respectively connected to the binding post 84 and the post 112; the oscillating switch 108. A similar wire 132 has its ends respectively connected to the binding post 116 of the oscillating switch 108 and the binding post 80. A further wire 134 employed has its ends respectively connected to the post 114 of the switch 108 and to the post 96 of the condenser 90.

Similarly a wire 136 has its opposite ends respectively connected to the binding post 98 of the condenser 90 and to the binding post 82, the latter being mounted on the lamination of insulation 74.

A wire 138 extends from the binding post 82 to the insulation 140 of a flexible electrical conduit cable, the end of said wire 138 indicated at 158 in Figure 2, is electrically connected to a resilient electrode clip 62 by means of a screw or similar keeper 161.

The other wire is housed within the insulation 140, said other wire being indicated at 142 has an end connected to the binding post 86 and the other end 156 of the wire 142 is connected, as shown in Figure 2, by means of a screw 157 to a further resilient clip-electrode 160 employed.

Referring to Figure 2 by insulation of the spring clip electrode 160 it may be readily attached to the portion 168 of a self-propelled vehicle, said portion being a fender or the like whereby the end 156 of the wire 142 is grounded to the frame of the vehicle.

The other spring electrode 162 may be manipulated to place it in contact with a binding post 164 of the battery 166 of the said self-propelled vehicle whereby, at times when the manipulatable switches of the new device are in a closed position and an electrical circuit is closed through the battery 166 for energizing the electrical circuits of the new device and for actuating the incandescent lamps thereof as more particularly later explained.

A further circuit wire 144 is employed and has its ends respectively connected to the binding post 82 and to the bindings posts 106 of the manipulatable switch 100, and the latter being a push-pull type.

A similar wire 146 is provided having its opposite ends respectively connected to the binding post 104 of the switch 100 and to a terminal end of the filament 58' of the above mentioned sealed beam type incandescent lamp, said wire 146 extending through an opening provided through the plate 46.

The insulation wrapping 140 for the conduit wires 156 and 158 extends through an aperture 150 provided through the back wall 26 of the housing or frame 10 as best shown in Figure 3.

At times when the flexible extension cable 140 is not in use it may be conveniently stored upon the oppositely disposed hooks A and B, said hooks being provided at each end of a strap 152 the latter being secured to the cover plate wall 26 of the housing by any suitable means such as the screws or keepers 154. During said storage the resilient clip electrodes 158 and 160 are conveniently secured to the member 140 as shown in Figure 3 for compact storage of the whole device.

In operation and assuming that a tire of the self-propelled vehicle becomes punctured the operator of the vehicle parks the latter adjacent to an edge of the pavement of the highway whereupon the bottom of the new device is placed upon the surface of the pavement of said highway in a manner whereby the incandescent lamps of red color point in opposite direction in parallelism with the longitudinal length of said highway, the sealed beam incandescent lamp at this time being directed toward the tire to be changed.

The operator now connects the resilient clips 160 and 162 to the vehicle as above described for electrifying the circuits of the new device at times when the push-pull switch 100 is in a closed position and the manipulatable lever 110 of the switch 108 is moved to a position to close the circuits through the switch 108 and as thus described it will be noted that a white light is steadily directed upon the work, namely the tire to be changed of the vehicle and that the red colored warning lights are directed in both directions upon the roadway, said red colored lights being respectively displayed cooperatively by means of the oscillating switch and flasher condenser 90 whereby the red colored lights are intermittently displayed for warning motorists approaching from opposite directions on the highway to operate their respective vehicles carefully by slowing down their speeds since the operator is in a dangerous position on pavement at the side of a highway.

Among other advantages of the invention it is believed pertinent to mention that by an employment of the new device the operator of a passenger bus particularly is relieved from the necessity as heretofore practiced of often driving a mile more along the side of a highway in order to find a safe place to park his vehicle during the changing of a flat tire whereby tire costs are involved.

From the foregoing description it is thought to be obvious that a roadside signal lighting device constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. A device for providing a factor of safety facilitating a changing of a tire of a self-propelled vehicle upon a roadway comprising a housing having at least three side walls with openings therein, two of said side walls being disposed in approximate parallelism with respect to each other and positioned on opposite sides of the housing, the third wall being disposed at substantially a right angle with respect to the said parallel walls; at least one incandescent lamp carried by each one of the said parallel walls, said lamps being positioned in the openings of the side walls and arranged to distribute red colored light beams in opposite directions at times when said lamps are electrically energized; a further incandescent lamp having a reflector for amplifying light beams projected therefrom at approximately a right angle with respect to said colored light beams at times when said further lamp is electrically actuated, an electrical circuit for said red colored lamps having a manipulatable-switch for opening and closing said circuit and an oscillating-switch in said circuit for causing said circuit to be intermittently opened and closed at times when said manipulatable-switch is closed, a further electrical circuit for said further lamp having a second manipulatable-switch for opening and closing said further lamp circuit, a flexible electrical extension cable having two conductor wires provided with ends in electrical communication with said circuits, a resilient clamp-electrode electrically connected to the other ends of each of the said wires, said clamps being adapted to be respectively electrically connected to the battery of a self-propelled vehicle and grounded to the frame of said vehicle for electrically energizing said circuits at times when said manual switches are closed for causing red colored warning lights to be displayed in two opposite directions intermittently and cooperatively causing light beams to be emitted from said housing simultaneously and at substantially a right angle to said red colored light beams.

2. In a motor vehicle trouble light, the combination which comprises a rectangular-shaped box-like housing having parallel oppositely disposed side walls and a front wall positioned perpendicular to the said side walls, said side walls having vertically spaced openings therein and said front wall having an enlarged opening therein, lamps positioned in said openings, a cable extended from said housing and having clips on the extended end for connecting the cable to a battery of a vehicle, means connecting the end of the cable in the housing to the said lamps in the openings thereof, and means intermittently breaking the circuits to the lamps in the openings in the sides of the housing whereby with the said trouble light positioned on a highway beside a vehicle with the front of the housing facing the vehicle the lamps in the sides flash warning signals to vehicles approaching from the front and also from the rear.

EDWIN M. CLINES.

REFERENCES CITED

The following references are of record in the file of this patent:

UNITED STATES PATENTS

| Number | Name | Date |
| --- | --- | --- |
| 2,165,562 | Mack et al. | July 11, 1931 |
| 2,312,649 | Kelly | Mar. 2, 1943 |
| 2,491,094 | Du Frane | Dec. 13, 1949 |
| 2,496,618 | Cox et al. | Feb. 7, 1950 |